United States Patent
Koo

(10) Patent No.: US 9,656,848 B2
(45) Date of Patent: May 23, 2017

(54) REFRIGERATOR SUPPLYING HEATED WATER BASED ON THE BODY TEMPERATURE OF A USER AND CONTROL METHOD THEREOF

(71) Applicant: Dongbu Daewoo Electronics Corporation, Seoul (KR)

(72) Inventor: Kwan Seo Koo, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 138 days.

(21) Appl. No.: 14/568,591

(22) Filed: Dec. 12, 2014

(65) Prior Publication Data
US 2016/0083238 A1    Mar. 24, 2016

(30) Foreign Application Priority Data

Sep. 23, 2014    (KR) .................. 10-2014-0126544

(51) Int. Cl.
*B67D 1/00* (2006.01)
*B67D 7/14* (2010.01)
(Continued)

(52) U.S. Cl.
CPC ......... *B67D 1/0014* (2013.01); *B67D 1/0858* (2013.01); *B67D 1/0884* (2013.01);
(Continued)

(58) Field of Classification Search
CPC .. B67D 1/0014; B67D 1/0858; B67D 1/0884; B67D 1/0895; B67D 1/0888;
(Continued)

(56) References Cited

U.S. PATENT DOCUMENTS 5,220,807 A * 6/1993 Bourne .................. F24D 17/02
165/58
6,164,189 A * 12/2000 Anson ..................... A47J 31/56
222/146.5

(Continued)

FOREIGN PATENT DOCUMENTS

JP    2011184889    9/2011
JP    2011184889 A * 9/2011
(Continued)

OTHER PUBLICATIONS

JP 2011184889—English Translation, machine generated, Sep. 2016.*

*Primary Examiner* — J. Casimer Jacyna
*Assistant Examiner* — Benjamin R Shaw

(57) ABSTRACT

A refrigerator capable of dispensing water adapted to an individual user's body temperature and a control method thereof. The refrigerator includes a selection unit for the user to select form body temperature water, cold water, and hot water. A temperature detecting unit is configured to detect a temperature of an external object through contact, for example a user's finger. The detected object temperature is interpreted as the user's body temperature. A controller is configured to receive a signal from the selection unit and a signal from the temperature detecting unit. Water stored in the refrigerator can be heated to the detected external object temperature before dispensing.

12 Claims, 4 Drawing Sheets

(51) Int. Cl.
    *F25D 23/12* (2006.01)
    *B67D 1/08* (2006.01)
    *G01K 13/00* (2006.01)
    *F25D 31/00* (2006.01)

(52) U.S. Cl.
    CPC ......... *B67D 1/0895* (2013.01); *F25D 23/126* (2013.01); *G01K 13/002* (2013.01); *B67D 1/0888* (2013.01); *B67D 2210/00036* (2013.01); *B67D 2210/00099* (2013.01); *F25D 31/005* (2013.01); *F25D 2323/122* (2013.01); *F25D 2700/04* (2013.01); *F25D 2700/16* (2013.01); *G01K 2207/00* (2013.01)

(58) Field of Classification Search
    CPC   B67D 2210/00036; B67D 2210/00099; F25D 23/126; F25D 31/005; F25D 2323/122; F25D 2700/04; F25D 2700/16; G01K 13/00; G01K 13/002; G01K 2207/00
    USPC .......................................................... 222/52
    See application file for complete search history.

(56) References Cited

U.S. PATENT DOCUMENTS

| | | | |
|---|---|---|---|
| 6,427,772 B1 * | 8/2002 | Oden | F25D 21/006 165/11.1 |
| 8,636,174 B1 * | 1/2014 | Motkowski | B67D 1/1295 222/1 |
| 2006/0144066 A1 * | 7/2006 | Lee | F25D 23/12 62/238.6 |
| 2008/0110935 A1 * | 5/2008 | Huber | A47J 31/404 222/221 |
| 2008/0264092 A1 * | 10/2008 | Chase | B67D 1/0858 62/389 |
| 2009/0159611 A1 * | 6/2009 | Roetker | B67D 1/0858 222/1 |
| 2010/0294804 A1 * | 11/2010 | Dalchau | B67D 1/0014 222/146.1 |
| 2012/0138629 A1 * | 6/2012 | Ashrafzadeh | B67D 1/0858 222/1 |
| 2013/0104586 A1 * | 5/2013 | Krause | B67D 1/07 62/275 |
| 2014/0270724 A1 * | 9/2014 | Hall | B67D 7/82 392/341 |
| 2015/0232320 A1 * | 8/2015 | Wait | F25D 31/005 165/200 |

FOREIGN PATENT DOCUMENTS

| | | |
|---|---|---|
| KR | 1020090015247 A | 2/2009 |
| KR | 1020110048882 A | 5/2011 |

* cited by examiner

REFRIGERATOR SUPPLYING HEATED WATER BASED ON THE BODY TEMPERATURE OF A USER AND CONTROL METHOD THEREOF

CROSS-REFERENCE TO RELATED APPLICATIONS

This application claims benefit and priority from Korean Patent Application No. 10-2014-0126544, filed on Sep. 23, 2014, with the Korean Intellectual Property Office, the disclosure of which is incorporated herein in its entirety by reference.

TECHNICAL FIELD

The present disclosure relates to a refrigerator and control method thereof, and more specifically, to drinking water supply mechanisms in a refrigerator.

BACKGROUND

Modern refrigerators commonly integrate the functionalities of storing food or other perishable objects at low temperature, and dispensing cubed ice and cold drinking water, etc. Some refrigerators can also heat up water supplied thereto, e.g., from an outside water source and dispense hot water responsive to user demands.

Typically, a refrigerator capable of dispensing hot water includes a storage container for storing water, a heating device for heating the water stored in the storage container, a control device for controlling the heating device, and a piping device for supplying water to the storage container and dispensing the water. Water is first supplied to the storage container from an outside water source, and heated to a predetermined temperature by the heating device. The heated water is maintained at the predetermined temperature by the control device in conjunction with the heating device. Then, the stored hot water is provided to a user through a dispenser upon a request.

In general, if a person has a degraded immune system or is otherwise ill, the person may have difficulty in maintaining his/her body temperature after consuming water of much lower or much higher temperature than the body temperature. Unfortunately, in a conventional refrigerator capable of supplying hot water, the water is usually heated to and maintained at a predetermined temperature which is often much higher than the body temperature. Thus, the heated water may not be suitable to drink for a user having a degraded immune system.

SUMMARY

Provided herein are refrigerators capable of supplying heated water adapted to the body temperatures of individual users.

An exemplary embodiment of the present disclosure provides a refrigerator, including: a selection unit for receiving a user selection of body temperature water, cold water, or hot water; an input unit configured to receive a user request for dispensing water; a temperature detecting unit configured to detect a temperature of an external object (e.g., a finger of a user); and a controller coupled to the selection unit and the temperature detecting unit.

Another exemplary embodiment of the present disclosure provides a method of controlling a refrigerator, including: receiving a user selection of either body temperature water, cold water, or hot water; receiving a signal indicating a user request for providing selected water; detecting a temperature of an external object in contact with an temperature sensor installed on the refrigerator; heating water to the detected temperature of the external object; and dispensing heated water.

According to the exemplary embodiments of the present disclosure, it is advantageous to supply appropriate body temperature water according to a body temperature of a specific user.

According to the exemplary embodiments of the present disclosure, users can advantageously and conveniently get dispensed body temperature water, cold water, or hot water from a refrigerator water dispenser.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
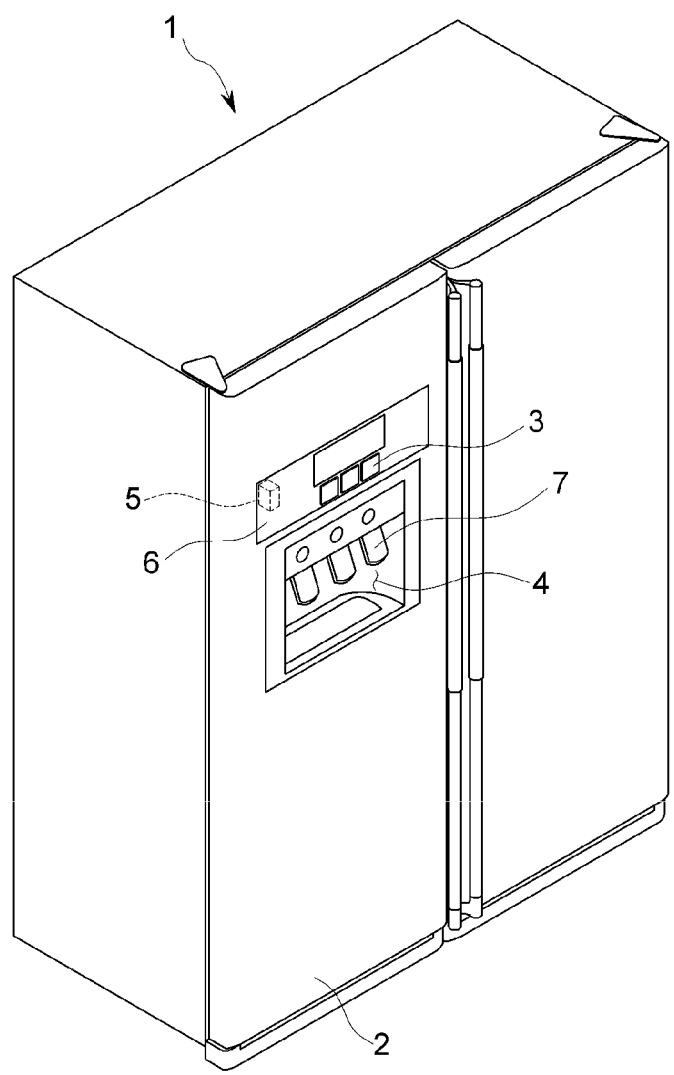
FIG. 1 is a perspective view of an exemplary refrigerator according to a first embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Refrigerator Supplying Heated Water Based on the Body Temperature of a User and Control Method Thereof FIG. 1 is a perspective view of an exemplary refrigerator according to a first embodiment of the present disclosure.

Referring to FIG. 1, the refrigerator includes a main body 1, refrigerator doors 2 for opening/closing the refrigerator, a selection unit 3 for receiving a user selection from options including body temperature water, cold water, and hot water, a dispenser unit 4 for dispensing water, an temperature detecting unit 5 for detecting a temperature of an external object, an input unit 6 for receiving a user request for dispensing water from the refrigerator, and a controller (not illustrated).

Although not illustrated in FIG. 1, the refrigerator according to the first exemplary embodiment of the present disclosure may further include a storage part for storing water, a heating unit for heating water, a discharge pipe for guiding water to be discharged, and a water supply motor for driving the water from the storage part to the outside of the main body through the discharge pipe.

More particularly, the doors 2 are used to open and close the refrigeration room and the freezing room. The selection unit 3 includes buttons and the like for user selection from various options of body temperature water, cold water, and hot water. When the user desires to drink body temperature water, the user may select the body temperature water option by pressing a body temperature water selection button. When the user desires to have cold water, the user may select the cold water option by pressing a cold water selection button. When the user desires to have hot water, the user may select the hot water by pressing a hot water selection button. In one embodiment, if the user does not select any button but touches only the input unit 6, the body temperature water is dispensed by default.

Figure 2:
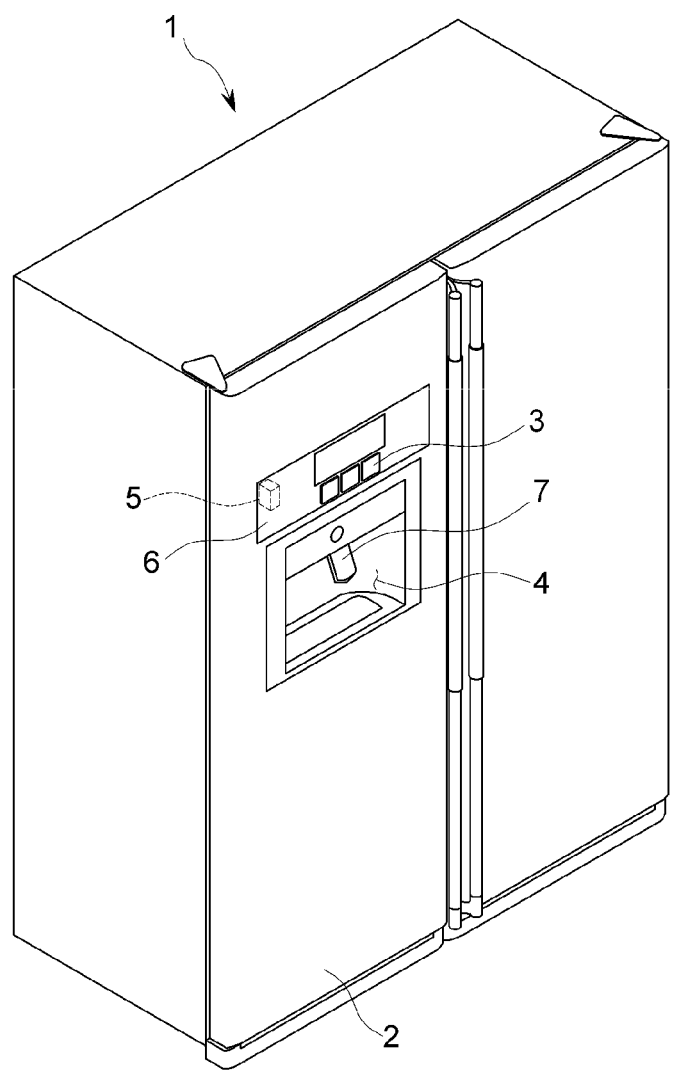
FIG. 2 is a perspective view of an exemplary refrigerator according to a second embodiment of the present disclosure.

The dispenser unit 4 is installed on the refrigerator door 2. The dispenser switches 7 include a body temperature water dispenser switch, a cold water dispenser switch, and a hot water dispenser switch. The controller which the user can use to control other functions of the refrigerator is installed at one side of the dispenser unit 4. In FIG. 2 to be described below, there is a single dispenser switch at the dispenser unit 4, and the user may be supplied with any one of the body temperature water, the cold water, and the hot water at a time through the single dispenser switch 7, depending on the selected choice.

The temperature detecting unit 5 includes a temperature detecting sensor for detecting a temperature of an external object touching the input unit 6, e.g., a user's hand or finger.

The input unit 6 may serve as a user interface for receiving a user instruction as well as displaying a temperature of the external object as detected by the temperature detecting unit 5. For example, a user may request to dispense water immediately by touching the input unit 6 after selecting a water type through the selection unit 3.

The controller (not illustrated in FIG. 1) may control various components of the refrigerator, including the heating unit and the water supply motor. The controller can dispense water based on the received signals indicative of the user's selection on water type and the request for immediate dispensing. Further, the controller may render the temperature detected by the detecting unit 5 to be displayed on the input unit 6. An operation of the controller will be described in detail below with reference to FIGS. 3 and 4.

The storage unit may include sealed containers for storing the body temperature water, the cold water, and the hot water, respectively, or a single sealed container for storing one of the body temperature water, the cold water, and the hot water. The storage unit may also include a storage unit temperature detecting unit for detecting a temperature of water stored in the storage unit.

The heating unit includes a heating member installed on an external surface of the storage unit, and a heat conducting member for coupling the heating member to the storage unit and transferring heat generated by the heating member to the storage unit, and may heat the water stored in the storage unit. Here, the heating member may be a heat wire or element for generating heat by electric resistance. Further, the heating unit may include a compressor that is an essential component of the refrigerator, and heat the water stored in the storage unit by using heat generated by the compressor.

FIG. 2 is a perspective view of a refrigerator according to a second exemplary embodiment of the present disclosure.

In FIG. 1, the dispenser switches 7 in the dispenser unit 4 include a body temperature water dispenser switch, a cold water dispenser switch, and a hot water dispenser switch. The user can get body temperature water, the cold water, or the hot water by pressing one of the dispenser switches 7. In FIG. 2, the user may be supplied with at least one of the body temperature water, the cold water, and the hot water from the storage units through the single dispenser switch 7, depending on the user selection.

Figure 3:
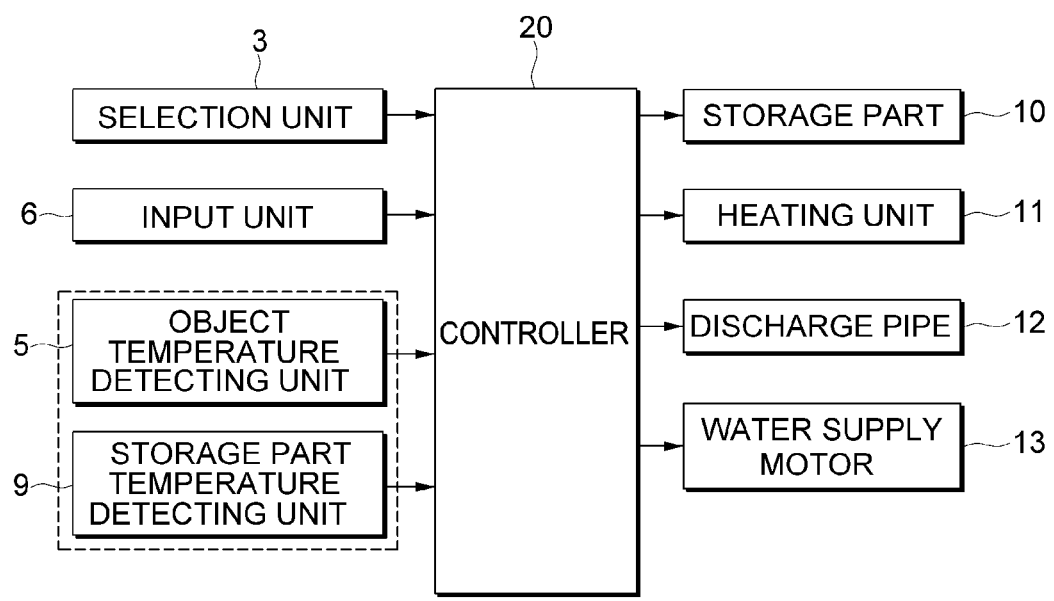
FIG. 3 is an internal block diagram of an exemplary refrigerator according to the embodiment of the present disclosure.

FIG. 3 is an internal block diagram of the refrigerator according to the exemplary embodiment of the present disclosure.

Referring to FIG. 3, the refrigerator may include the selection unit 3, the input unit 6, the temperature detecting unit 5, a storage unit temperature detecting unit 9, a controller 20, a storage unit 10, a heating unit 11, a discharge pipe 12, and a water supply motor 13.

The selection unit 3 is formed by buttons or keys or inputs for selecting one or more of the body temperature water, the cold water, and the hot water, and the user may select at least one of the options between body temperature water, the cold water, and the hot water through the selection unit 3.

The input unit 6 may receive a user selection from the three options (the body temperature water, the cold water, and the hot water) through the selection unit 3, and transmits the corresponding signal to the controller 20. The user may select from the three options by touching the input unit 6.

Responsive to a user request for dispensing water received through the input unit 6, the object temperature detecting unit 55 detects the temperature of an object in contact with the input unit 6, which is interpreted as the body temperature of the user.

The storage unit temperature detecting unit 9 detects a temperature of the sealed container (e.g., the storage unit 10) containing at least one of the body temperature water, the cold water, and the hot water. The storage unit 10 is coupled to the discharge pipe 12.

The controller 20 controls the operations of the heating unit 11 and the water supply motor 13 based on the user selection and the signal from the object temperature detecting unit 5. For example, when hot water is requested by the user by the selection unit 3, the controller 20 controls the heating unit 11 to heat the water stored in the storage unit 10 to a predetermined temperature.

When body temperature water is requested by a user by the selection unit 3, the controller 20 compares the temperature of the water stored in the storage unit 10 (as detected by the storage unit temperature detecting unit 9A) and the temperature of the external object (as detected by the object temperature detecting unit 5). Accordingly, the controller controls the heating unit 11 to heat the water stored in the storage unit 10 to the detected temperature of the external object. It is appreciated that a user's finger temperature may not be equal to his or her body temperature. Thus, in some other embodiments, if the user selects body temperature, the controller can cause the water to be heated to a higher or lower temperature than detected object temperature by a predetermined degree.

When cold water is requested by a user by the selection unit 3, the controller 20 performs no control operation on the heating unit 11.

The controller 20 may control the water supply motor 13 to transfer water stored in the storage unit 10 to the water dispenser. Here, the water supply motor 13 drives the flow of the water along the discharge pipe 12 from the storage unit 10 to the outside of the main body.

The storage unit 10 may include separate sealed containers for storing body temperature water, cold water, and hot water, respectively. In another embodiment, the storage unit 10 includes a single sealed container for storing one of body temperature water, cold water, and hot water.

To provide body temperature water or hot water as demanded by users, the heating unit 11 heats the water stored in the storage unit 10, e.g., using the heating elements controlled by controller 20 or using the heat dissipated from the refrigerator compressor.

Figure 4:
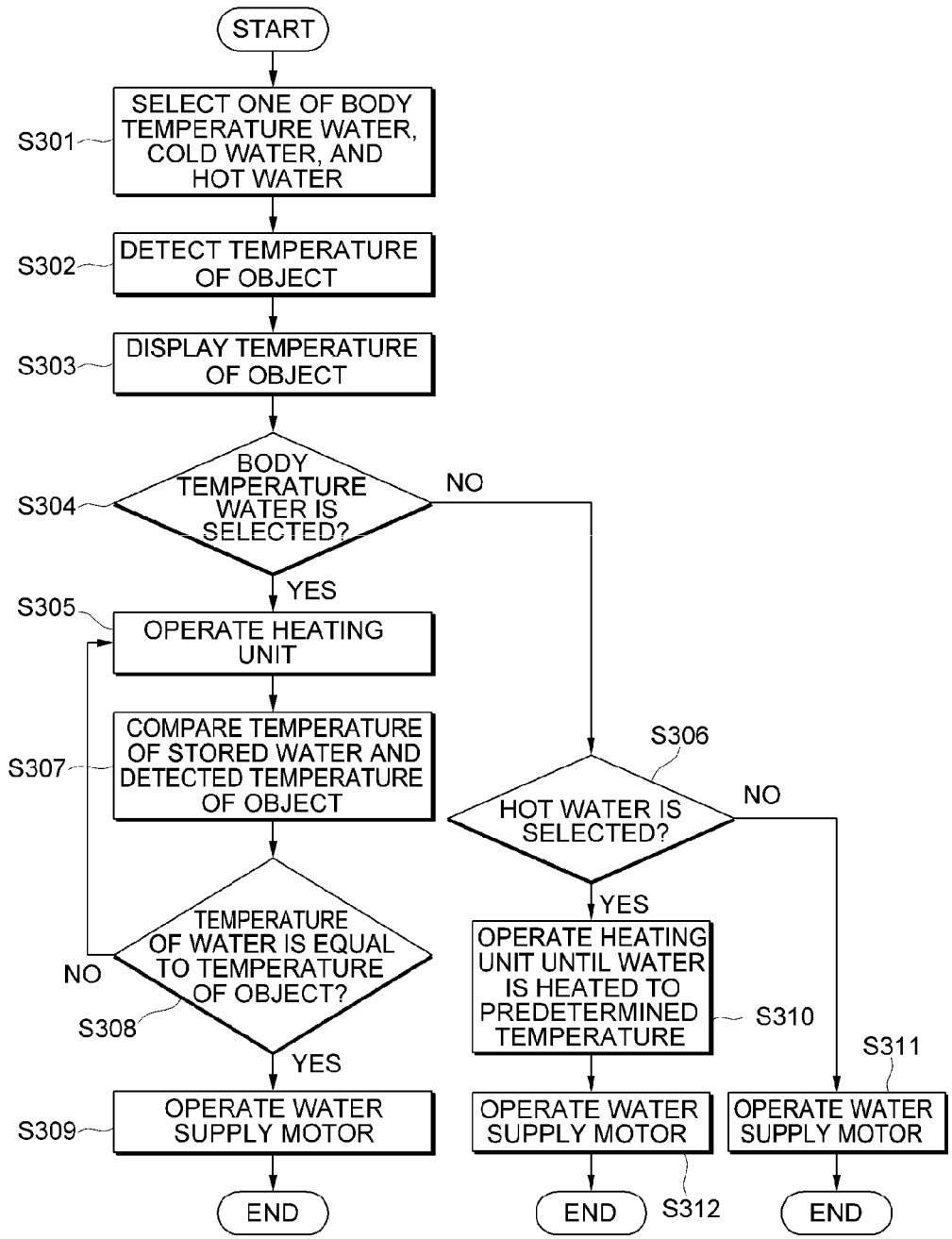
FIG. 4 is a flowchart illustrating an exemplary control method of the refrigerator according to an embodiment of the present disclosure.

FIG. 4 is a flowchart illustrating an exemplary control method of the refrigerator according to an embodiment of the present disclosure. Referring to FIG. 4, the selection unit 3 receives a user request to dispense one of body temperature water, cold water, and/or hot water, and generates a corresponding signal indicating this selection (S301).

Next, when the user touches the input unit 6 using a finger, for example, the object temperature detecting unit 5 detects the temperature of the finger (S302). The detected finger temperature is displayed (S303) on the display panel. If it is determined that body temperature water is selected through the selection unit 3 at S301 (S304), the controller 20 heats the water stored in the storage unit 10 by controlling the operations of the heating unit 11 (S305).

If it is determined at S304 that body temperature water is not selected through the selection unit 3, the controller determines whether hot water is selected (S306).

When it is determined that hot water is selected in S306, the controller 20 heats the water stored in the storage unit 10 to a predetermined temperature by controlling the operations of the heating unit 11. Then, the controller 20 may control the water supply motor 13 to deliver water from the storage unit 10 up to the dispenser control switch 7. Upon the user interacting with the dispenser control switch 7, hot water at the predetermined temperature is dispensed (S312).

If it is determined that hot water is not selected in operation S306 and the cold water is selected through the selection unit 3, the controller performs no control operation on the heating unit 11. To provide unheated water to the user, the controller 20 may control the water supply motor 13 to transport water from the storing part 10 up to the dispenser control switch. Upon the user interacting with the dispenser control switch 7, cold water is dispensed through the dispenser control switch 7 (S311).

After S305, the controller 20 continuously compares the temperature of water stored in the storage unit 10 and the temperature of the object detected in operation S302 (S307). If at S308 it is determined that the temperature of the water stored in the storage unit 10 is not equal to the detected temperature of the external object, the process returns to S305 and the controller 20 controls the heating unit 11 to heat up the water stored in the storage unit 10. If at S308 it is determined that the temperature of the water stored in the storage unit 10 is equal to the detected temperature of the external object, the controller 20 may cause the water stored in the storage unit 10 to be delivered up to the dispenser switch 7.

According to the exemplary embodiments of the present disclosure, a refrigerator can advantageously supply drinking water adapted to a specific user's body temperature, which is beneficial the user's health. The refrigerator advantageously allows a user to conveniently obtain body temperature water, cold water, or hot water from the refrigerator according to personal needs, thereby considerably improving a commercial value of the refrigerator.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A refrigerator, comprising:
    a selection unit configured to receive a user selection of one of a first input option representing water in a first temperature range; a second input option representing water in a second temperature range; and a third input option representing water in a third temperature range;
    an input unit configured to receive a user request to dispense water from the refrigerator;
    a temperature detecting unit coupled to the input unit and configured to detect a temperature of an external object; and
    a controller configured to receive a signal from the selection unit and a signal from the temperature detecting unit, and, responsive thereto, control dispensing water based on the signals,
    wherein the temperature detecting unit is configured to detect a temperature of the external object when the external object is in contact with the input unit.

2. The refrigerator of claim 1, wherein the controller is configured to cause water to be heated up to a detected temperature of the external object.

3. The refrigerator of claim 1 further comprising:
a storage unit configured to store water;
a heating unit configured to heat stored water; and
a discharge pipe configured to guide heated water for dispensing.

4. The refrigerator of claim 3, wherein the controller is configured to control the heating unit until a temperature of the water is equal to the temperature of the external object.

5. The refrigerator of claim 1, wherein the temperature detecting unit is configured to detect a touch interaction with the external object and to detect a temperature of the external object subsequent to the user selection from the selection unit.

6. The refrigerator of claim 1, wherein the input unit is configured to display the temperature of the external object, and wherein the temperature detecting unit comprises a temperature sensor.

7. The refrigerator of claim 1, wherein the controller is configured to render the temperature of the external object detected by the temperature detecting unit for display on the input unit.

8. The refrigerator of claim 3, wherein the storage unit comprises a sealed container coupled to the discharge pipe, and wherein the heating unit comprises a heat element.

9. The refrigerator of claim 3, wherein the storage unit comprises a sealed container coupled to the discharge pipe, and wherein the heating unit comprises a compressor.

10. The refrigerator of claim 3, wherein the controller is configured to control a water supply motor to transport water from the storage unit to a point outside of a main body through the discharge pipe.

11. The refrigerator of claim 3, wherein if second input option is selected through the selection unit, the controller is configured to control the heating unit to heat the water stored in the storage unit to a predetermined temperature.

12. The refrigerator of claim 3, wherein if a second input option is selected through the selection unit, the controller performs no control operation over the heating unit.

* * * * *